United States Patent
Kaneko et al.

(10) Patent No.: US 11,345,366 B2
(45) Date of Patent: May 31, 2022

(54) IN-VEHICLE PROCESSING DEVICE

(71) Applicant: Clarion Co., Ltd., Saitama (JP)

(72) Inventors: Takayuki Kaneko, Saitama (JP); Daiki Kurosawa, Saitama (JP); Hiroshi Shojima, Asaka (JP)

(73) Assignee: CLARION CO., LTD., Saitama (JP)

( * ) Notice: Subject to any disclaimer, the term of this patent is extended or adjusted under 35 U.S.C. 154(b) by 91 days.

(21) Appl. No.: 16/924,534

(22) Filed: Jul. 9, 2020

(65) Prior Publication Data

US 2021/0016792 A1    Jan. 21, 2021

(30) Foreign Application Priority Data

Jul. 16, 2019 (JP) .............................. JP2019-131233

(51) Int. Cl.
  *B60W 60/00*   (2020.01)
  *B60W 10/20*   (2006.01)
  (Continued)

(52) U.S. Cl.
  CPC .......... *B60W 60/001* (2020.02); *B60W 10/20* (2013.01); *B60W 40/06* (2013.01);
  (Continued)

(58) Field of Classification Search
  CPC .......... G06K 9/00798; G06K 9/00805; G05D 1/0212; G05D 2201/0213; G01C 21/3407;
  (Continued)

(56) References Cited

U.S. PATENT DOCUMENTS

| 5,229,941 A | * | 7/1993 | Hattori | G05D 1/0217 |
| | | | | 180/167 |
| 2015/0345959 A1 | * | 12/2015 | Meuleau | G05D 1/0217 |
| | | | | 701/23 |

(Continued)

FOREIGN PATENT DOCUMENTS

| DE | 102017200216 | 7/2018 |
| EP | 3674664 | 7/2020 |

(Continued)

OTHER PUBLICATIONS

Extended European SearchReport dated May 7, 2021 in corresponding European Patent Application No. 20185804.0.

*Primary Examiner* — Babar Sarwar
(74) *Attorney, Agent, or Firm* — Wenderoth, Lind & Ponack, L.L.P.

(57) ABSTRACT

An in-vehicle processing device includes an offset route generation part configured to generate an offset route by offsetting to an oncoming lane an outbound route in a street on which the host vehicle has previously traveled, a candidate point generation part configured to generate a plurality of candidate points that are candidates for a return route based on the offset route generated by the offset route generation part, a candidate route generation part configured to generate a plurality of candidate routes by connecting the candidate points generated by the candidate point generation part, and a route selection part configured to select the return route based on the plurality of candidate routes generated by the candidate route generation part.

4 Claims, 17 Drawing Sheets

(51) Int. Cl.
  *B60W 40/06* (2012.01)
  *G06V 20/58* (2022.01)
  *G06V 20/56* (2022.01)

(52) U.S. Cl.
  CPC ............ *G06V 20/58* (2022.01); *G06V 20/588* (2022.01); *B60W 2520/06* (2013.01); *B60W 2554/80* (2020.02); *B60W 2556/10* (2020.02)

(58) Field of Classification Search
  CPC ............ B60W 10/20; B60W 2520/06; B60W 2554/80; B60W 2556/10; B60W 40/06; B60W 60/001
  See application file for complete search history.

(56) References Cited

U.S. PATENT DOCUMENTS

| | | | |
|---|---|---|---|
| 2015/0353085 A1* | 12/2015 | Lee | B60W 30/12 |
| | | | 701/533 |
| 2018/0129203 A1* | 5/2018 | Tafti | G05D 1/0005 |
| 2018/0194344 A1* | 7/2018 | Wang | G05D 1/0257 |
| 2019/0329822 A1 | 10/2019 | Ebner et al. | |
| 2020/0122721 A1* | 4/2020 | Zhang | B60W 30/12 |

FOREIGN PATENT DOCUMENTS

| | | | |
|---|---|---|---|
| JP | 2017-134725 | 8/2017 | |
| JP | 2017-211733 | 11/2017 | |
| WO | 2018/175441 | 9/2018 | |
| WO | WO-2018175441 A1 * | 9/2018 | ........... G05D 1/0221 |

* cited by examiner

IN-VEHICLE PROCESSING DEVICE

CROSS-REFERENCE TO RELATED APPLICATION

This application is based upon and claims the benefit of priority from Japanese patent application No. 2019-131233 filed on Jul. 16, 2019, the entire disclosure of which is incorporated herein by reference.

BACKGROUND ART

The present disclosure relates to an in-vehicle processing device for generating routes for a host vehicle.

Conventionally, it is known in the art to generate a route for a subject or host vehicle based on routes on which the host vehicle has previously traveled (see Patent Literature 1:JP 2017-134725 A, for example).

Patent Literature 1 discloses a route generation device that generates a route for the host vehicle based on the data of the routes on which the host vehicle has previously traveled.

However, Patent Literature 1 does not disclose generating a return route. Accordingly, the route generation device disclosed in Patent Literature 1 is not capable of generating a return route based on an outbound route on which the host vehicle has previously traveled.

An object of the present disclosure is to provide an in-vehicle processing device that generates a return route for a host vehicle based on an outbound route on which the host vehicle has previously traveled.

SUMMARY

To achieve the above object, an in-vehicle processing device according to the present disclosure includes an offset route generation part configured to generate an offset route by offsetting to an oncoming lane an outbound route in a street on which a host vehicle has traveled, a candidate point generation part configured to generate a plurality of candidate points that are candidates for a return route based on the offset route generated by the offset route generation part, a candidate route generation part configured to generate a plurality of candidate routes by connecting the candidate points generated by the candidate point generation part, and a route selection part configured to select the return route based on the plurality of candidate routes generated by the candidate route generation part.

In addition, the in-vehicle processing device according to the present disclosure includes a candidate point generation part configured to generate a plurality of candidate points in relation to an outbound route in a street on which a host vehicle has traveled, a candidate route generation part configured to generate a plurality of candidate routes by connecting the candidate points generated by the candidate point generation part, and a route selection part configured to select a return route based on the plurality of candidate routes generated by the candidate route generation part, wherein the candidate route generation part is also configured to generate the plurality of candidate routes on an oncoming lane opposite to the outbound route.

Further, the in-vehicle processing device according to the present disclosure includes a candidate point generation part configured to generate a plurality of candidate points in relation to an outbound route in a street on which a host vehicle has traveled, a candidate route generation part configured to generate a plurality of candidate routes by connecting the candidate points generated by the candidate point generation part, and a route selection part configured to select a return route based on the plurality of candidate routes generated by the candidate route generation part, wherein the route selection part is also configured to select the candidate routes on an oncoming lane opposite to the outbound route.

Moreover, the in-vehicle processing device according to the present disclosure includes a candidate point generation part configured to generate a plurality of candidate points in relation to an outbound route in a street on which a host vehicle has traveled, a candidate route generation part configured to generate a plurality of candidate routes by connecting the candidate points generated by the candidate point generation part, and a route selection part configured to select a return route based on the plurality of candidate routes generated by the candidate route generation part, wherein the candidate point generation part is also configured to generate the plurality of candidate points on an oncoming lane opposite to the outbound route.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for the sake of clarity.

Hereinafter, embodiments that achieve an in-vehicle processing device according to the present disclosure will be described with reference to a first embodiment to a fourth embodiment shown in the figures.

First Embodiment

A travel route generation system including an in-vehicle processing device according to the first embodiment is installed in a vehicle such as an automobile. In the first embodiment, the explanation will be given with a case where a subject or host vehicle travels autonomously on a return route when exiting from a parking lot or space based on an outbound route on which the host vehicle has previously traveled when entering the parking space. The return route and the outbound route are on the same street.

Figure 1:
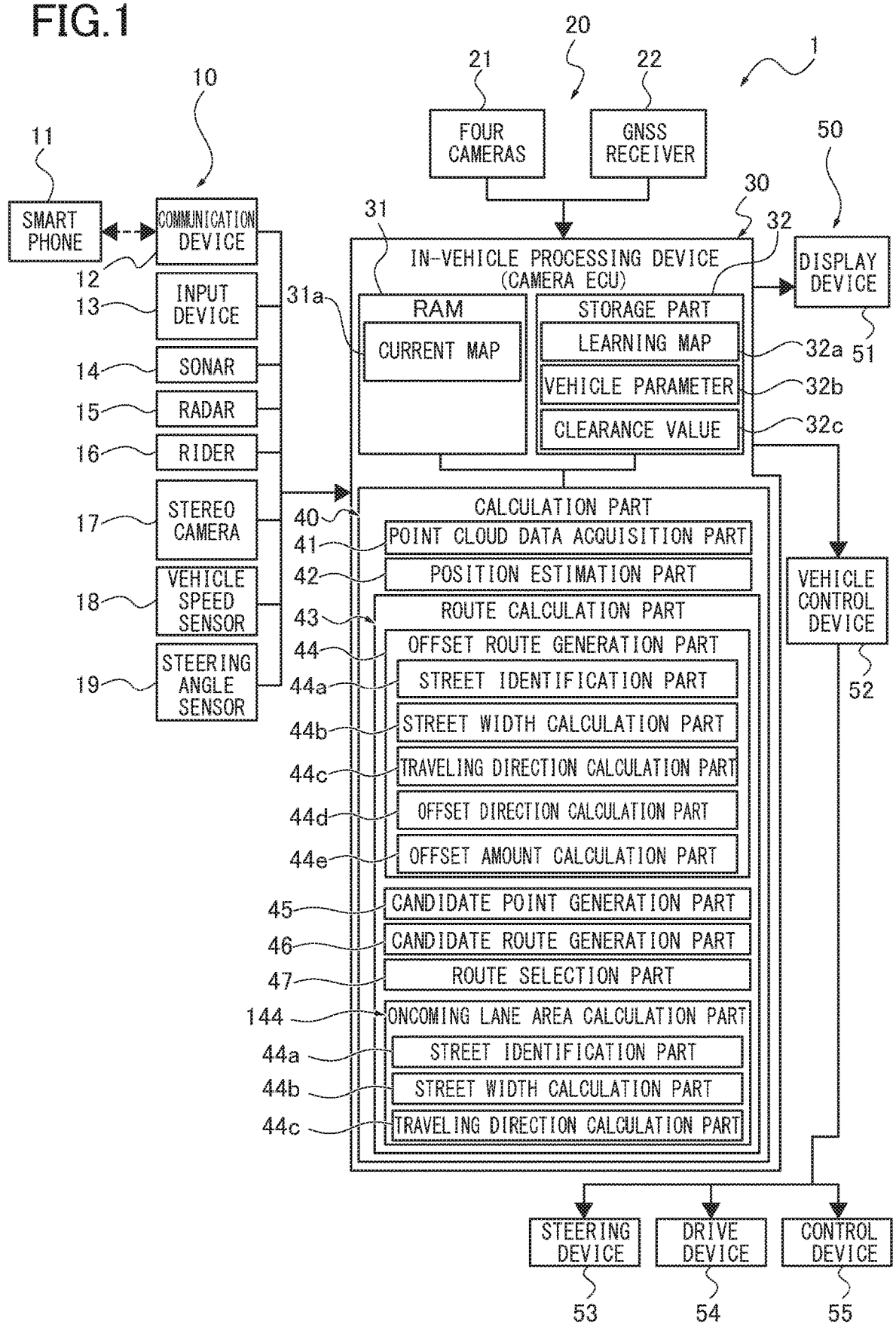
FIG. 1 is a structure diagram illustrating a travel route generation system according to a first embodiment of the present disclosure.

FIG. 1 is a structure diagram illustrating the travel route generation system according to the first embodiment. Hereinafter, the configuration of the travel route generation system according to the first embodiment will be described with reference to FIG. 1.

A travel route generation system 1 includes a first input part 10, a second input part 20, an in-vehicle processing device 30, and an output part 50.

The first input part 10 includes a smartphone 11 as a mobile terminal, a communication device 12 that is capable of bidirectionally communication, an input device 13, a sonar 14, a radar 15, a rider 16, a stereo camera 17, a vehicle speed sensor 18, and a steering angle sensor 19.

The smartphone 11 includes an input screen. A user can enter or input an instruction on the input screen for entry to or exit from the parking space.

The communication device 12 is, for example, TCU (Telematics Communication Unit), and configured to bidirectionally communicate with the smartphone 11. The communication device 12 receives information on entry to or exit from the parking space in relation to the host vehicle and inputs the information to the in-vehicle processing device 30.

The input device 13 is, for example, a navigation system and includes map information. The map information is input to the in-vehicle processing device 30.

The sonar 14 is attached to a front bumper of the host vehicle, for example. The sonar 14 is configured to emit sound waves and receive the reflected waves from an obstacle to determine the direction from the host vehicle to the obstacle and measure the distance between the host vehicle and the obstacle. The obstacle includes other vehicles, pedestrians, curbstones, bollards, car stops, and the like. In other words, the sonar 14 is configured to determine and measure peripheral information around the host vehicle. The peripheral information around the host vehicle determined and measured by the sonar 14 is input to the in-vehicle processing device 30.

The radar 15 is attached to the front bumper of the host vehicle, for example. The radar 15 is configured to emit radio waves and receive the reflected radio waves from the obstacle to determine the direction from the host vehicle to the obstacle and measure the distance between the host vehicle and the obstacle. In other words, the radar 15 is configured to determine and measure the peripheral information around the host vehicle. The peripheral information around the host vehicle determined and measured by the radar 15 is input to the in-vehicle processing device 30.

The rider 16 is attached to the front bumper of the host vehicle, for example. The rider 16 is configured to emit laser light and receive the reflected laser light from the obstacle to determine the direction from the host vehicle to the obstacle and measure the distance between the host vehicle and the obstacle. In other words, the rider 16 is configured to determine and measure the peripheral information around the host vehicle. The peripheral information around the host vehicle determined and measured by the rider 16 is input to the in-vehicle processing device 30.

The stereo camera 17 is attached in the vicinity of a rear-view mirror, for example. The stereo camera 17 is configured to determine the direction from the host vehicle to the obstacle and measure the distance between the host vehicle and the obstacle based on image information. In addition, the stereo camera 17 obtains information on road markings such as lines of the parking spaces, lines of the pedestrian passages, and the like from the image information. In other words, the stereo camera 17 is configured to determine and measure the peripheral information around the host vehicle. The peripheral information around the host vehicle determined and measured by the stereo camera 17 is input to the in-vehicle processing device 30.

The vehicle speed sensor 18 is configured to detect the vehicle speed of the host vehicle. In other words, the vehicle speed sensor 18 is configured to detect information on the host vehicle. The information on the host vehicle detected by the vehicle speed sensor 18 is input to the in-vehicle processing device 30.

The steering angle sensor 19 is configured to detect the steering angle of the steering of the host vehicle. In other words, the steering angle sensor 19 is configured to detect information on the host vehicle. The information on the host vehicle detected by the steering angle sensor 19 is input to the in-vehicle processing device 30.

The second input part 20 includes four cameras 21, and a GNSS receiver 22 (or a GPS receiver).

The cameras 21 are attached to the front bumper, a rear bumper, left and right side mirrors or wing mirrors, and the like of the host vehicle, respectively. Each of the cameras 21 is configured to photograph or capture images around the host vehicle in a predetermined shooting range different from those of the other cameras 21. The entire periphery of the host vehicle can be covered by combining the shooting ranges of all of the cameras 21. In other words, each of the cameras 21 is configured to capture peripheral information around the host vehicle. The peripheral information around the host vehicle captured by the cameras 21 is input to the in-vehicle processing device 30.

The GNSS receiver 22 is configured to receive signals from a plurality of satellites which constitute a satellite navigation system, and calculate the position (latitude and longitude, for example) of the GNSS receiver 22 by calculation based on the received signals. The positional information calculated by the GNSS receiver 22 is input to the in-vehicle processing device 30.

The in-vehicle processing device 30 includes RAM 31, a storage part 32, and a calculation part 40.

The RAM 31 is configured to store a current map 31a around the host vehicle. The current map 31a is generated based on the map information from the input device 13, the peripheral information around the host vehicle from the sonar 14, the radar 15, the rider 16, the stereo camera 17 and the cameras 21, and the positional information calculated by the GNSS receiver 22.

The storage part 32 is configured to store a learning map 32a. The learning map 32a is generated based on the map information from the input device 13, the peripheral information around the host vehicle input from the sonar 14, the radar 15, the rider 16, the stereo camera 17 and the cameras 21, and the positional information calculated by the GNSS receiver 22.

The learning map 32a includes information on the routes (also referred to as route information) on which the host vehicle has previously traveled. The route information includes information on an outbound route on which the host vehicle has previously traveled and information on obstacles and/or road markings that exist around the outbound route. The information on the outbound route is stored as node points arranged at approximately one-meter intervals, for example. The information on the obstacles and/or the road markings is stored as target points, for example.

In addition, the storage part 32 stores a vehicle parameter 32b. The vehicle parameter 32b is information of the host vehicle such as the vehicle width, the tread width, the mounting position of a steering wheel, countries to which vehicles are exported or used, and the like.

Further, the storage part 32 stores a clearance value 32c. The clearance value 32c is a distance from the center of the host vehicle to an edge of the street in the width direction of the host vehicle. For example, the clearance value is two meters [m]. The clearance value 32c is set such that the distance from the center of the host vehicle to the edge of the street in the width direction of the host vehicle becomes one meter [m], for example.

The calculation part 40 includes a point cloud data acquisition part 41, a position estimation part 42, and a route calculation part 43. The calculation part 40 is configured to entirely control the in-vehicle processing device 30.

The point cloud data acquisition part 41 is configured to acquire the learning map 32a. The position estimation part 42 is configured to estimate the position of the host vehicle on the current map 31a from the positional information calculated by the GNSS receiver 22.

The output part 50 includes a display device 51, a vehicle control device 52, a steering device 53, a drive device 54, and a control device 55.

The display device 51 is configured to display processed information calculated by the route calculation part 43. The vehicle control device 52 is configured to calculate the control amount for a steering as the steering device 53, an accelerator as the drive device 54, and a shift and a brake as the control device 55 based on the processed information calculated by the route calculation part 43, and provide commands to the steering device 53, the drive device 54, and the control device 55.

Figure 2:
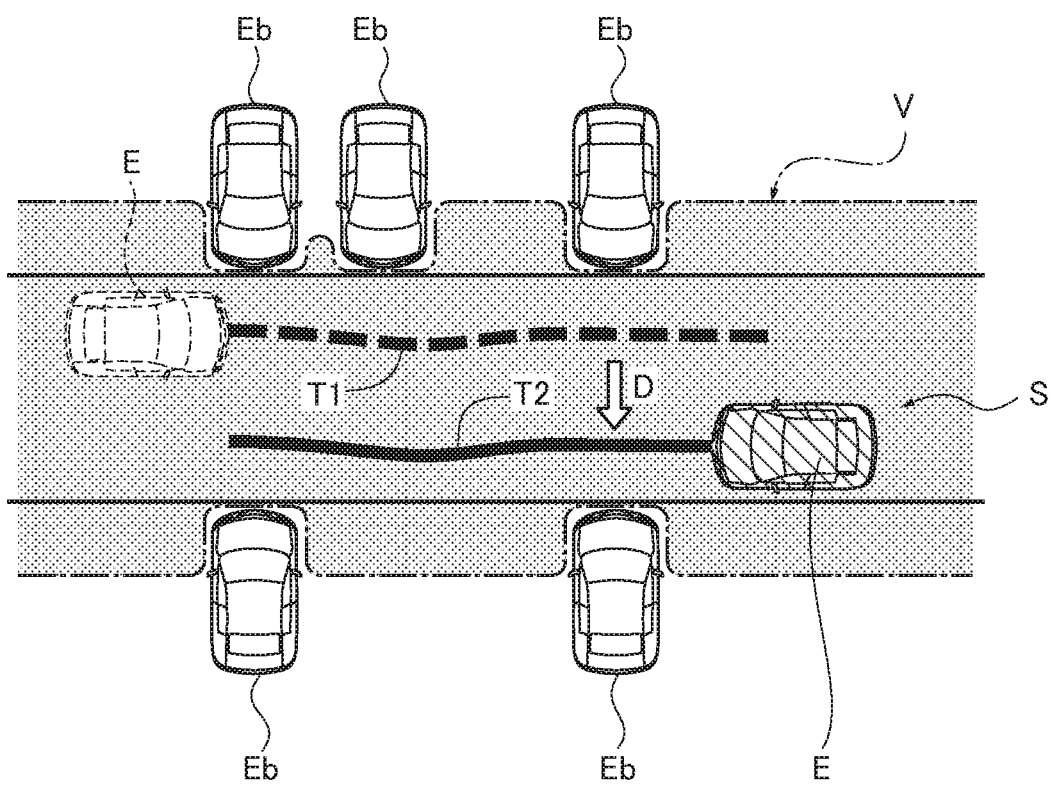
FIG. 2 is a schematic view illustrating an offset route generation part according to the first embodiment.
Figure 3:
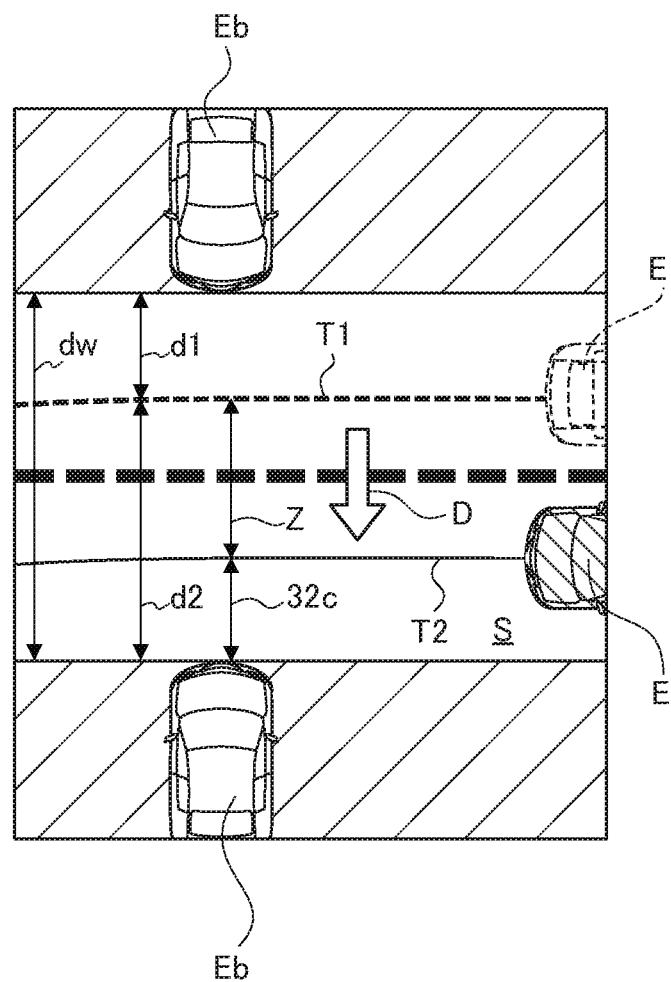
FIG. 3 is a schematic view illustrating the offset route generation part according to the first embodiment.
Figure 4:
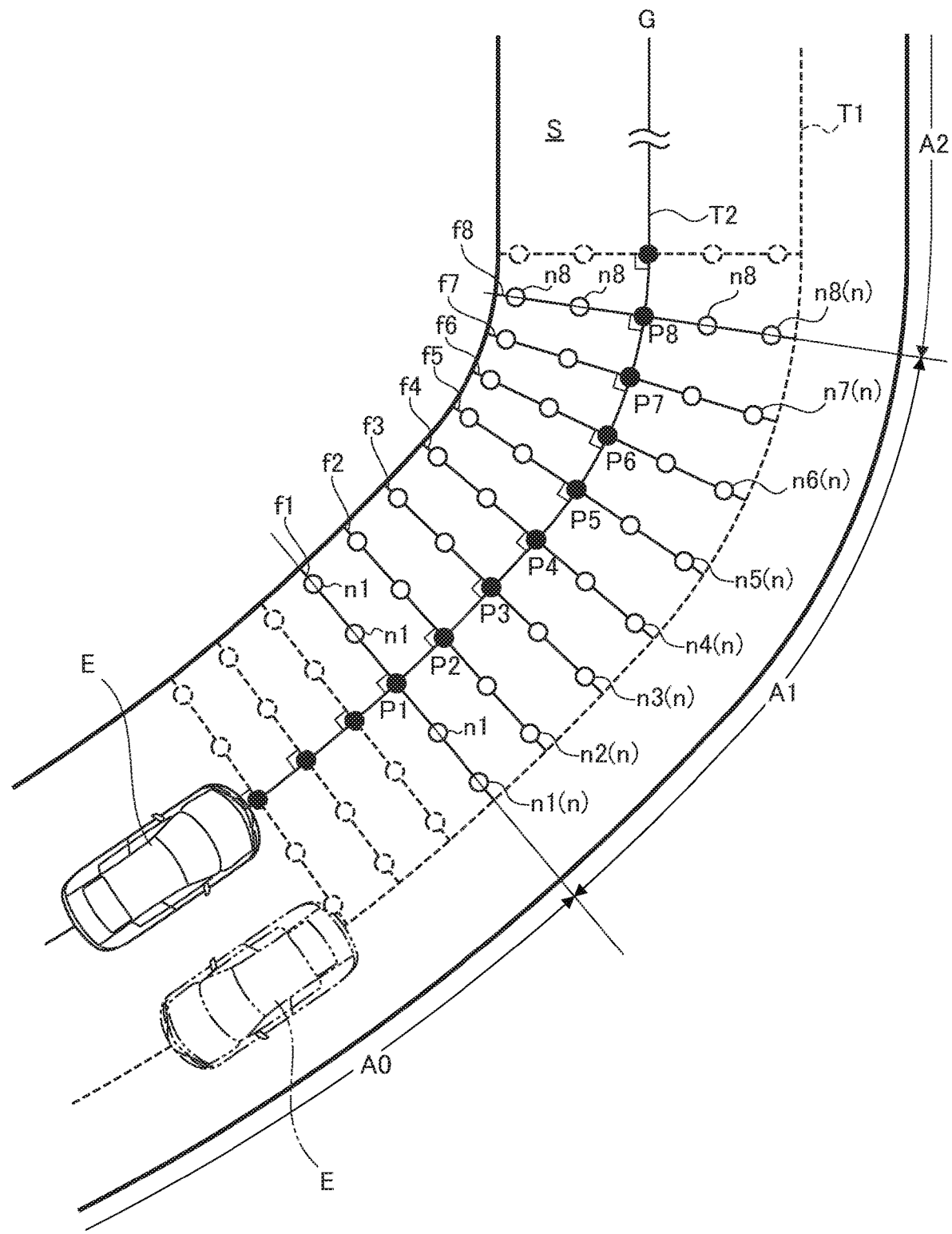
FIG. 4 is a schematic view illustrating a candidate point generation part according to the first embodiment.
Figure 5:
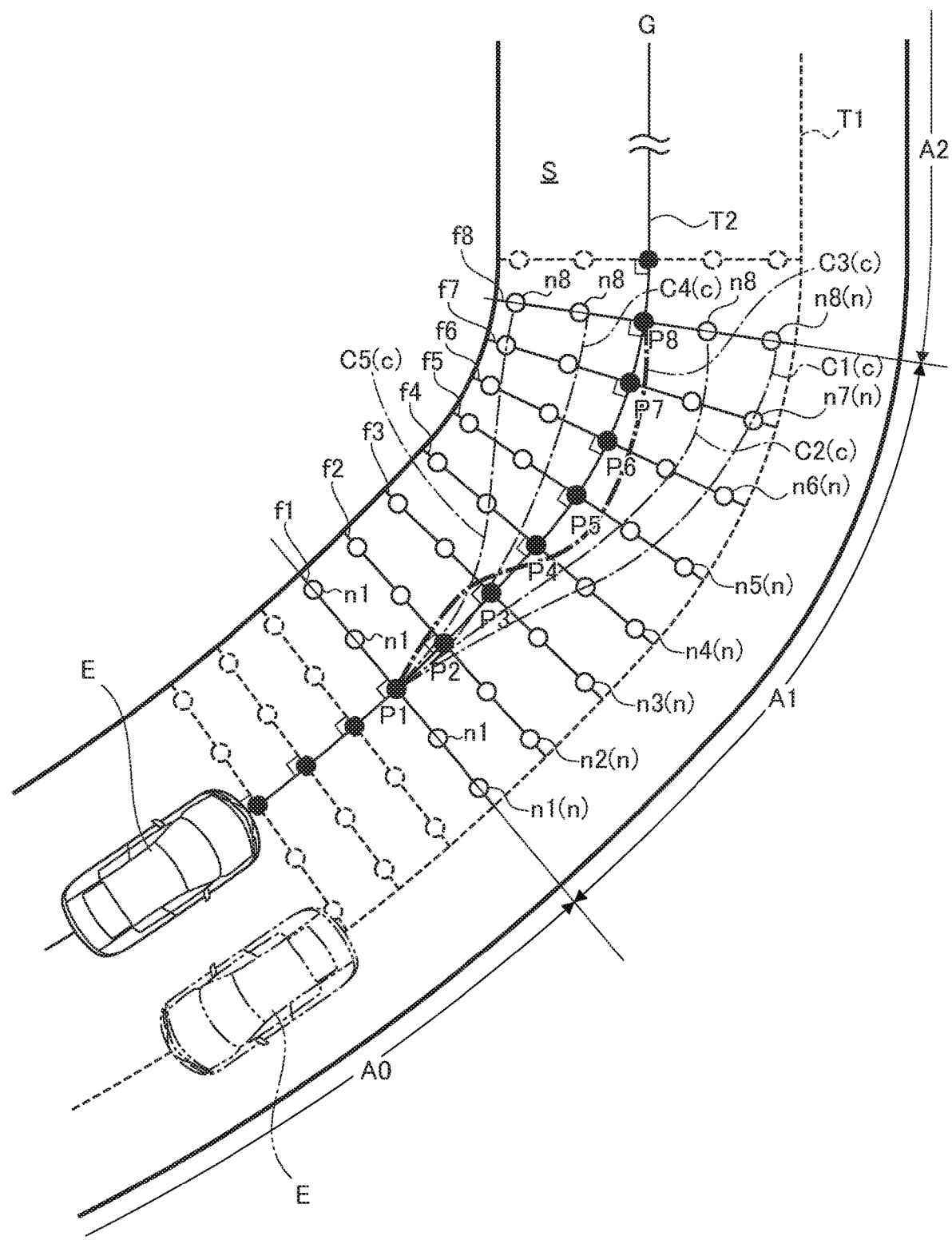
FIG. 5 is a schematic view illustrating a candidate route generation part and a route selection part according to the first embodiment.

FIG. 2 and FIG. 3 are schematic views illustrating an offset route generation part according to the first embodiment. FIG. 4 is a schematic view illustrating a candidate point generation part according to the first embodiment. FIG. 5 is a schematic view illustrating the candidate route generation part and the route selection part according to the first embodiment. Hereinafter, a route calculation part 43 according to the first embodiment will be described with reference to FIG. 2 to FIG. 5.

As shown in FIG. 1, the route calculation part 43 includes an offset route generation part 44, a candidate point generation part 45, a candidate route generation part 46, a route selection part 47.

The offset route generation part 44 includes a street identification part 44a, a street width calculation part 44b, a traveling direction calculation part 44c, an offset direction calculation part 44d, and an offset amount calculation part 44e.

As shown in FIG. 2, the offset route generation part 44 generates an offset route T2. The offset route T2 is a route offset from the outbound route T1, on which the host vehicle E has previously traveled, to the width direction of a road or street S and an offset direction D toward an oncoming lane.

The street identification part 44a identifies the street S on which the host vehicle E travels based on the peripheral information around the host vehicle E from the sonar 14, the radar 15, the rider 16, the stereo camera 17, and the cameras 21.

Specifically, the street identification part 44a identifies, as the street S, the narrowest area in the width direction of the host vehicle E among the areas V without obstacles such as parked vehicles, walls, curbstones and the like calculated based on the peripheral information around the host vehicle E. The areas V may be areas without the obstacles such as other vehicles, walls, curbstones and the like and the road markings such as the lines of the parking spaces, the lines of the pedestrian passage.

As shown in FIG. 3, the street width calculation part 44b calculates the street width (width) dw of the street S identified by the street identification part 44a. In addition, the street width calculation part 44b calculates a first street width d1 and a second street width d2 based on the street width dw and the positional information calculated by the GNSS receiver 22. The first street width d1 is on the left side from the center of the host vehicle E and the second street width d2 is on the right side from the center of the host vehicle E in the traveling direction of the host vehicle E on the outbound route T1. The sum of the first street width d1 and the second street width d2 is the street width dw.

The traveling direction calculation part 44c calculates the traveling direction of the host vehicle E on the street S based on the vehicle parameter 32b. For example, the traveling direction calculation part 44c determines that the traveling direction is on the left side of the street S, i.e. the left-side driving in the case where the host vehicle E is used in Japan.

It should be noted that the traveling direction calculation part 44c may determine or calculate the traveling direction of the host vehicle E in the street S based on the first street width d1 and the second street width d2. For example, the traveling direction calculation part 44c determines that the traveling direction is on the left side of the street S, i.e. the left-side driving when the first street width d1 is narrower than the second street width d2. The traveling direction calculation part 44c determines that the traveling direction is on the right side of the street S, i.e. the right-side driving when the second street width d2 is narrower than the first street width d1.

The offset direction calculation part 44d calculates an offset direction D from the traveling direction calculated by the traveling direction calculation part 44c. In the case where the traveling direction is on the left side of the street S, i.e. the left-side driving, the offset direction D is a direction to the right side of the street S in the width direction of the host vehicle E. In the case where the traveling direction is on the right side of the street S, i.e. the right-side driving, the offset direction D is a direction to the left side of the street S in the width direction of the host vehicle E. In other words, the offset direction D is a direction to the oncoming lane opposite to the traveling direction of the host vehicle E.

The offset amount calculation part 44e calculates an offset amount Z by which the outbound route T1 is offset to the offset direction D based on the clearance value 32c, the width of the host vehicle E, and the second street width d2. For example, the offset amount Z is equal to or more than the width of the host vehicle E and calculated such that the offset route T2 secures the clearance value 32c.

Specifically, the offset route generation part 44 generates the offset route T2 by offsetting the outbound route T1, on which the host vehicle E has previously traveled, to the width direction of the street S and to the offset direction D toward the oncoming lane by the offset amount Z.

As shown in FIG. 4, the candidate point generation part 45 generates a plurality of candidate points n in a predetermined zone A1 in relation to the offset route T2 based on the current peripheral information around the host vehicle and the current information on the host vehicle. The candidate point generation part 45 does not generate the candidate points n in places with obstacles.

The offset route T2 is generated to a destination point G by connecting a plurality of node points P. The candidate points n are generated in the predetermined zone A1 forward of the zone A0 where the host vehicle E is now traveling. The candidate points n are respectively arranged on perpendicular lines f1 to f8 of the offset route T2 along with each of node points P1 to P8 of the zone A1. The four candidate points n1 are equally arranged on the perpendicular line f1 relative to the node point P1. Similarly, the four candidate points n2 to n8 are equally arranged on the perpendicular lines f2 to f8 relative to the node points P2 to P8, respectively.

As shown in FIG. 5, the candidate route generation part 46 generates a plurality of candidate routes C by connecting the candidate points n generated by the candidate point generation part 45. The candidate route generation part 46 generates the plurality of candidate routes C in the zone A1 based on the speed of the host vehicle E traveling in the zone A0. The candidate route generation part 46 selects the candidate points n to be connected (the candidate points n8, for example) further away from the host vehicle E when the speed of the host vehicle E is relatively high. On the other hand, the candidate route generation part 46 selects the candidate points n to be connected (the candidate points n7, for example) closer to the host vehicle E when the speed of the host vehicle E is relatively slow. In the first embodiment, five candidate routes C1 to C5 are generated. The candidate points n include the node points P.

As shown in FIG. 5, the route selection part 47 selects the return route C3 by weighting the five candidate routes C1 to C5 with the total distances thereof.

The route selection part 47 weights the candidate routes C1 to C5 and evaluates the candidate route having the shortest total distance as the highest grade so that the return route C3 is selected. In other words, the route selection part 47 selects the return route C3 by considering the total distances of the candidate routes C.

The route selection part 47 may weight the candidate routes C1 to C5 and evaluates the candidate route having the smallest sum of curvatures as the highest grade to select the return route. The sum of curvatures is an area formed by the offset route T2 and the candidate routes C and is the sum of the yaw rate.

The route selection part 47 may weight the candidate routes C1 to C5 and evaluate as the highest grade one of the candidate routes whose distance in the vehicle width direction (transverse deviation amount) between the host vehicle E that travels in the zone A0 and the offset route T2 is the smallest to select the return route.

In this way, the route in the zone A1 next to the zone A0 is generated while the host vehicle E is traveling in the zone A0. Also, the route in the zone A2 next to the zone A1 is generated while the host vehicle E is traveling in the zone A1. In this way, the route is entirely generated to the destination point G.

Figure 6:
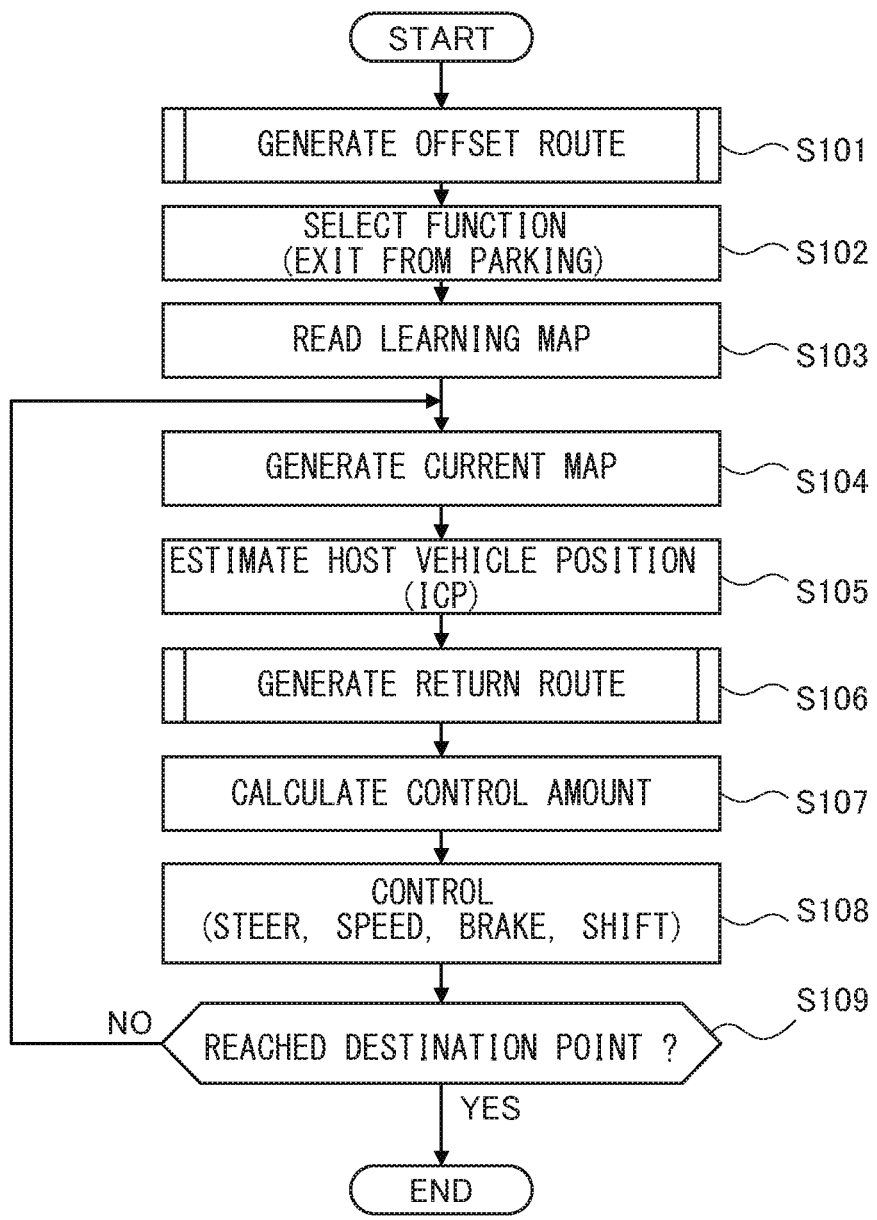
FIG. 6 is a flowchart showing a system flow of an in-vehicle processing device according to the first embodiment.
Figure 7:
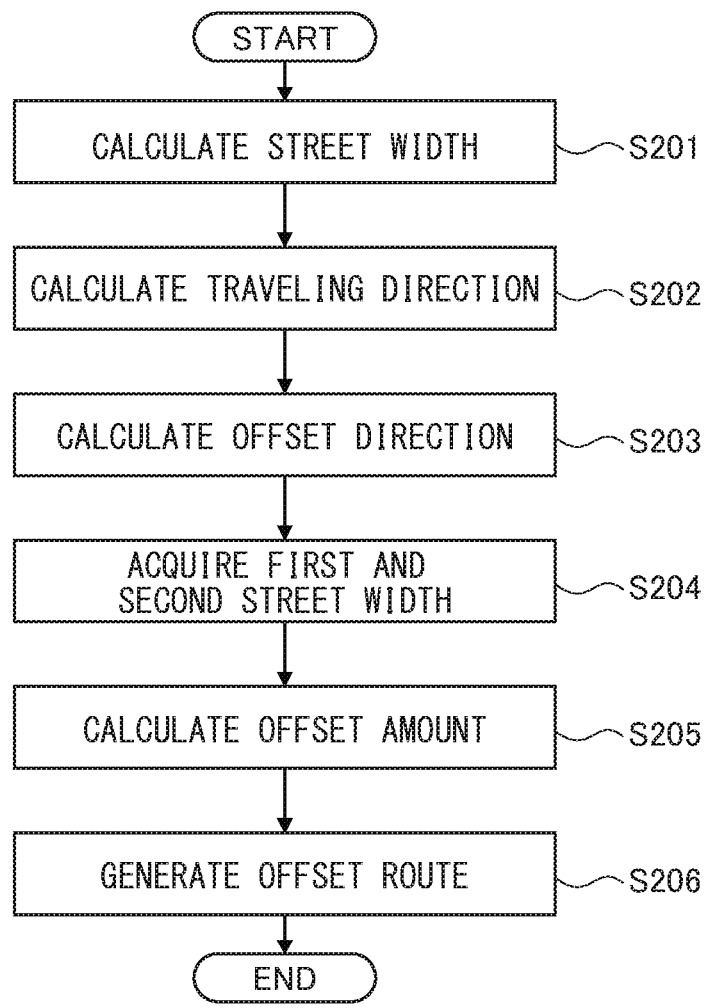
FIG. 7 is a flowchart showing a flow of an offset route generation process according to the first embodiment.
Figure 8:
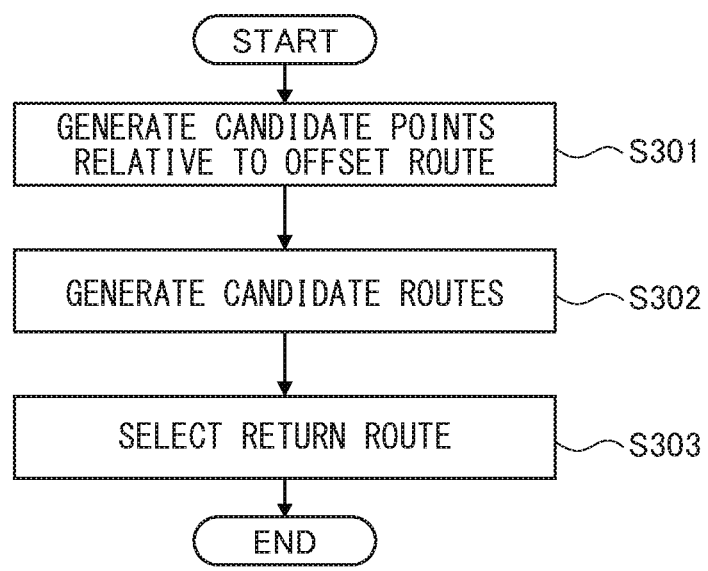
FIG. 8 is a flowchart showing a flow of a return route generation process according to the first embodiment.

FIG. 6 is a flowchart showing a system flow of the in-vehicle processing device according to the first embodiment. FIG. 7 is a flowchart showing a flow of an offset route generation process according to the first embodiment. FIG. 8 is a flowchart showing a flow of a return route generation process according to the first embodiment. Hereinafter, a flow of a process by the route calculation part 43 according to the first embodiment will be described with reference to FIG. 6 to FIG. 8.

As shown in FIG. 6, the offset route generation part 44 performs the offset route generation process when the host vehicle E enters the parking space (Step S101).

Then, the user inputs on the smartphone 11 the instruction regarding the exit from the parking space (Step S102), and the calculation part 40 reads the learning map 32a around the host vehicle from the positional information calculated by the GNSS receiver 22 (Step S103). Next, the calculation part 40 generates the current map 31a (Step S104). Then, the position estimation part 42 estimates the position of the host vehicle on the current map 31a from the positional information calculated by the GNSS receiver 22 (Step S105).

Then, the route calculation part 43 performs the return route generation process (Step S106). Next, the vehicle control device 52 calculates the control amount for each of the steering device 53, the drive device 54, and the control device 55 based on the information calculated by the route calculation part 43 (Step S107). The control amount is output to the steering device 53, the drive device 54, and the control device 55, respectively.

Then, the steering device 53, the drive device 54, and the control device 55 are controlled in accordance with the calculated control amount, respectively, and accordingly the host vehicle E travels in the zone A1 (Step S108).

Next, the calculation part 40 determines whether the host vehicle E has reached the destination point G or not (Step S109). The system flow of the in-vehicle processing device 30 is terminated in the case where the calculation part 40 determines that the host vehicle E has reached the destination point G (YES in Step S109). On the other hand, the flow returns to Step S104 in the case where the calculation part 40 determines that the host vehicle E has not reached the destination point G yet (NO in Step S109).

As shown in FIG. 7, the street width calculation part 44b of the offset route generation part 44 calculates the street width (width) dw of the street S identified by the street identification part 44a (Step S201).

Then, the traveling direction calculation part 44c calculates the traveling direction of the host vehicle E in the street S based on the vehicle parameter 32b (Step S202).

Next, the offset direction calculation part 44d calculates the offset direction D from the traveling direction calculated by the traveling direction calculation part 44c (Step S203).

Then, the street width calculation part 44b calculates the first street width d1 and the second street width d2 based on the street width dw and the positional information calculated by the GNSS receiver 22 (Step S204). The first street width d1 is on the left side from the center of the host vehicle E and the second street width d2 is on the right side from the center of the host vehicle E in the traveling direction of the host vehicle E on the outbound route T1.

Next, the offset amount calculation part 44e calculates the offset amount Z which is used to offset the outbound route T1 to the offset direction D based on the clearance value 32c, the width of the host vehicle E, and the second street width d2 (Step S205).

Next, the offset route generation part 44 generates the offset route T2 by offsetting the outbound route T1, on which the host vehicle E has previously traveled, to the width direction of the street S and to the offset direction D toward the oncoming lane by the offset amount Z (Step S206). Then, the offset route generation process is terminated.

As shown in FIG. 8, the candidate point generation part 45 generates a plurality of candidate points n in the predetermined zone A1 in relation to the offset route T2 based on the current peripheral information around the host vehicle and the current information on the host vehicle (Step S301).

Then, the candidate route generation part 46 generates a plurality of candidate routes C by connecting the candidate points n generated by the candidate point generation part 45 (Step S302).

Next, the route selection part 47 weights the five candidate routes C1 to C5 with the total distances thereof to select the return route C3 (Step S303). Then, the return route generation process is terminated.

The operation of the in-vehicle processing device 30 according to the first embodiment will be described. The in-vehicle processing device 30 according to the first embodiment includes the offset route generation part 44 configured to generate the offset route T2 by offsetting the outbound route T1 in the street S, on which the host vehicle E has traveled, to the oncoming lane, the candidate point generation part 45 configured to generate a plurality of candidate points n that are candidates for the return route C3 based on the offset route T2 generated by the offset route generation part 44, the candidate route generation part 46 configured to generate a plurality of candidate routes C by connecting the candidate points n generated by the candidate point generation part 45, and the route selection part configured to select the return route C3 based on the plurality of candidate routes C generated by the candidate route generation part 46.

Thereby, the return route C3 on which the host vehicle E travels can be generated based on the outbound route T1 on which the host vehicle E has previously traveled. Further, the offset route T2 can be distanced away from the outbound route T1. Moreover, the return route C3 generated by linking with the offset route T2 can be distanced away from the outbound route T1 as far as possible. Accordingly, an amount of meandering of the host vehicle E to avoid other vehicles traveling on the outbound route T1 can be reduced when the host vehicle E travels on the return route C3. As a result, the host vehicle E can travel on the return route C3 with the reduced meandering.

In the in-vehicle processing device 30 according to the first embodiment, the offset route T2 is calculated based on the outbound route T1 and the street width dw of the street S (FIG. 2 and FIG. 3).

Thereby, the offset route T2 can be distanced away from the outbound route T1 by increasing the offset amount Z when the street width dw is relatively wide. Accordingly, the return route C3 generated by linking with the offset route T2 can be distanced away from the outbound route T1. As a result, the host vehicle E can travel on the return route C3 without meandering.

On the other hand, when the street width dw is relatively narrow, the offset amount Z is reduced. However, the offset route T2 can be distanced away from the outbound route T1 as far as possible. Accordingly, the return route C3 generated by linking with the offset route T2 can be distanced away from the outbound route T1 as far as possible. As a result, an amount of meandering of the host vehicle E to avoid other vehicles traveling on the outbound route T1 can be reduced when the host vehicle E travels on the return route C3.

Second Embodiment

An in-vehicle processing device according to the second embodiment differs from the in-vehicle processing device according to the first embodiment in that the configurations of a candidate point generation part and a candidate route generation part differ from those of the candidate point generation part and the candidate route generation part according to the first embodiment.

Figure 9:
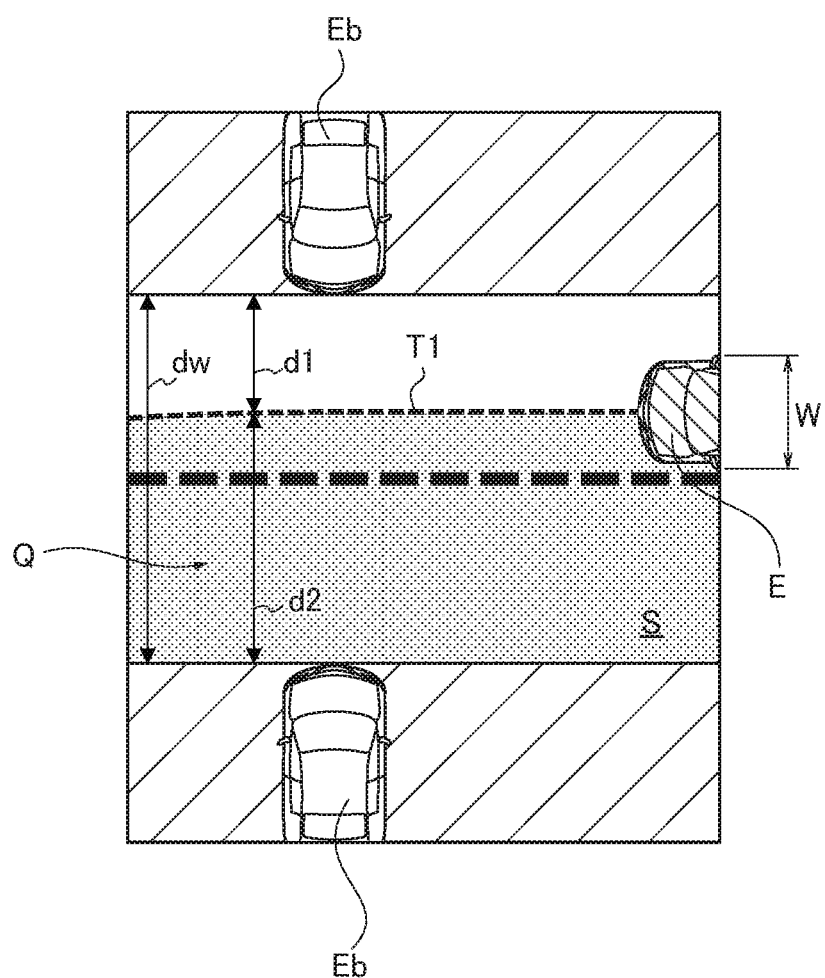
FIG. 9 is a schematic view illustrating an oncoming lane area calculation part according to a second embodiment.
Figure 10:
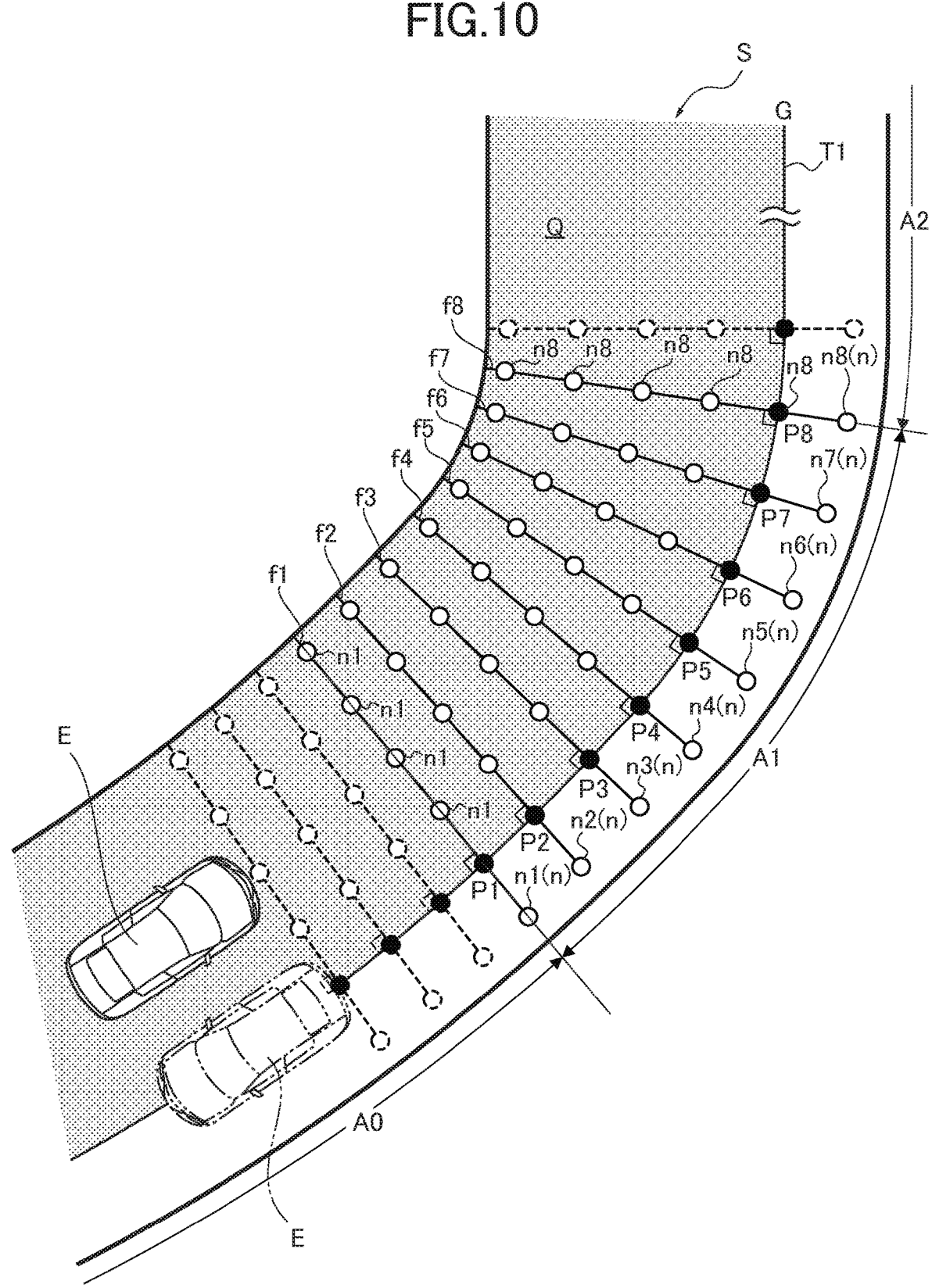
FIG. 10 is a schematic view illustrating a candidate point generation part according to the second embodiment.
Figure 11:
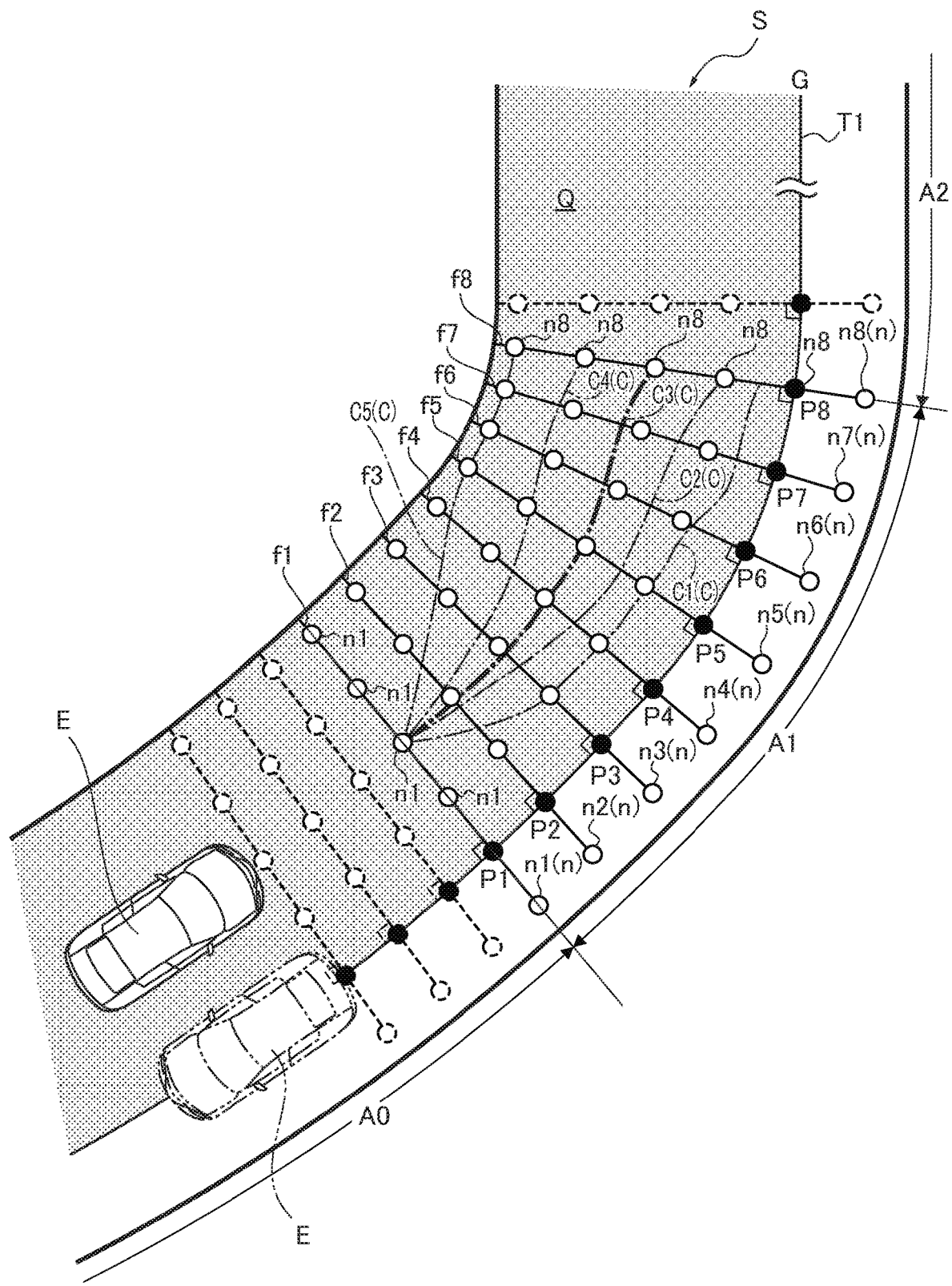
FIG. 11 is a schematic view illustrating a candidate route generation part and a route selection part according to the second embodiment.

FIG. 9 is a schematic view illustrating an oncoming lane area calculation part according to the second embodiment. FIG. 10 is a schematic view illustrating a candidate point generation part according to the second embodiment. FIG. 11 is a schematic view illustrating a candidate route generation part and a route selection part according to the second embodiment. Hereinafter, the configuration of the in-vehicle processing device according to the second embodiment will be described with reference to FIG. 9 to FIG. 11. It should be noted that the same terminologies and the same reference numerals are used for the elements identical or equivalent to the first embodiment.

As shown in FIG. 1, an in-vehicle processing device 30 according to the second embodiment includes an oncoming lane area calculation part 144. The oncoming lane area calculation part 144 includes a street identification part 44a, a street width calculation part 44b, and a traveling direction calculation part 44c.

As shown in FIG. 9, the oncoming lane area calculation part 144 calculates an oncoming lane area Q, which is on the oncoming lane side in the street S relative to the host vehicle E, from the traveling direction calculated by the traveling direction calculation part 44c.

The oncoming lane area Q is an area on the oncoming lane side in the street S relative to the host vehicle E rather than the outbound route T1. It should be noted that the oncoming lane area Q may be an area on the oncoming lane side away from the outbound route T1 by a distance of at least half of the width W of the host vehicle E.

The oncoming lane area Q is on the right side of the street S in the width direction of the host vehicle E in the case where the traveling direction of the host vehicle E is on the left side of the street S, i.e. the left-side driving. On the other hand, the oncoming lane area Q is on the left side of the street S in the width direction of the host vehicle E in the case where the traveling direction of the host vehicle E is on the right side of the street S, i.e. the right-side driving.

As shown in FIG. 10, the candidate point generation part 45 generates a plurality of candidate points n in a predetermined zone A1 in relation to the outbound route T1 based on the current peripheral information around the host vehicle and the current information on the host vehicle. The candidate point generation part 45 does not generate the candidate points n in the locations with the obstacles.

The outbound route T1 is generated to the destination point G by connecting a plurality of node points P. The candidate points n are generated in the predetermined zone A1 forward of the zone A0 where the host vehicle E is now traveling. The candidate points n are respectively arranged on perpendicular lines f1 to f8 in relation to the outbound route T1 along with each of node points P1 to P8 in the zone A1. The five candidate points n1 are arranged or distributed on the perpendicular line f1 in relation to the node point P1.

The five candidate points n1 are entirely generated over the street width dw of the street S. Similarly, the five candidate points n2 to n8 are respectively arranged on the perpendicular lines f2 to f8 in relation to the node points P2 to P8, respectively.

As shown in FIG. 11, the candidate route generation part 46 generates a plurality of candidate routes C1 to C5 in the oncoming lane area Q. In other words, the candidate route generation part 46 generates the plurality of candidate routes on the oncoming lane opposite to the outbound route T1 in the street S on which the host vehicle E has previously traveled.

The candidate route generation part 46 generates a plurality of candidate routes C by connecting the candidate points n generated by the candidate point generation part 45. The candidate route generation part 46 generates the plurality of candidate routes C in the zone A1 in accordance with the speed of the host vehicle E traveling in the zone A0. The candidate route generation part 46 selects the candidate points n to be connected (candidate points n8, for example) further away from the host vehicle E when the speed of the host vehicle E is relatively high. On the other hand, the candidate route generation part 46 selects the candidate points n to be connected closer to the host vehicle (candidate points n7, for example) when the speed of the host vehicle E is relatively slow. In the second embodiment, the five candidate routes C1 to C5 are generated. It should be noted that the candidate points n include the node points P.

As shown in FIG. 10, the route selection part 47 weights the five candidate routes C1 to C5 with the total distances thereof to select one of the return routes.

Figure 12:
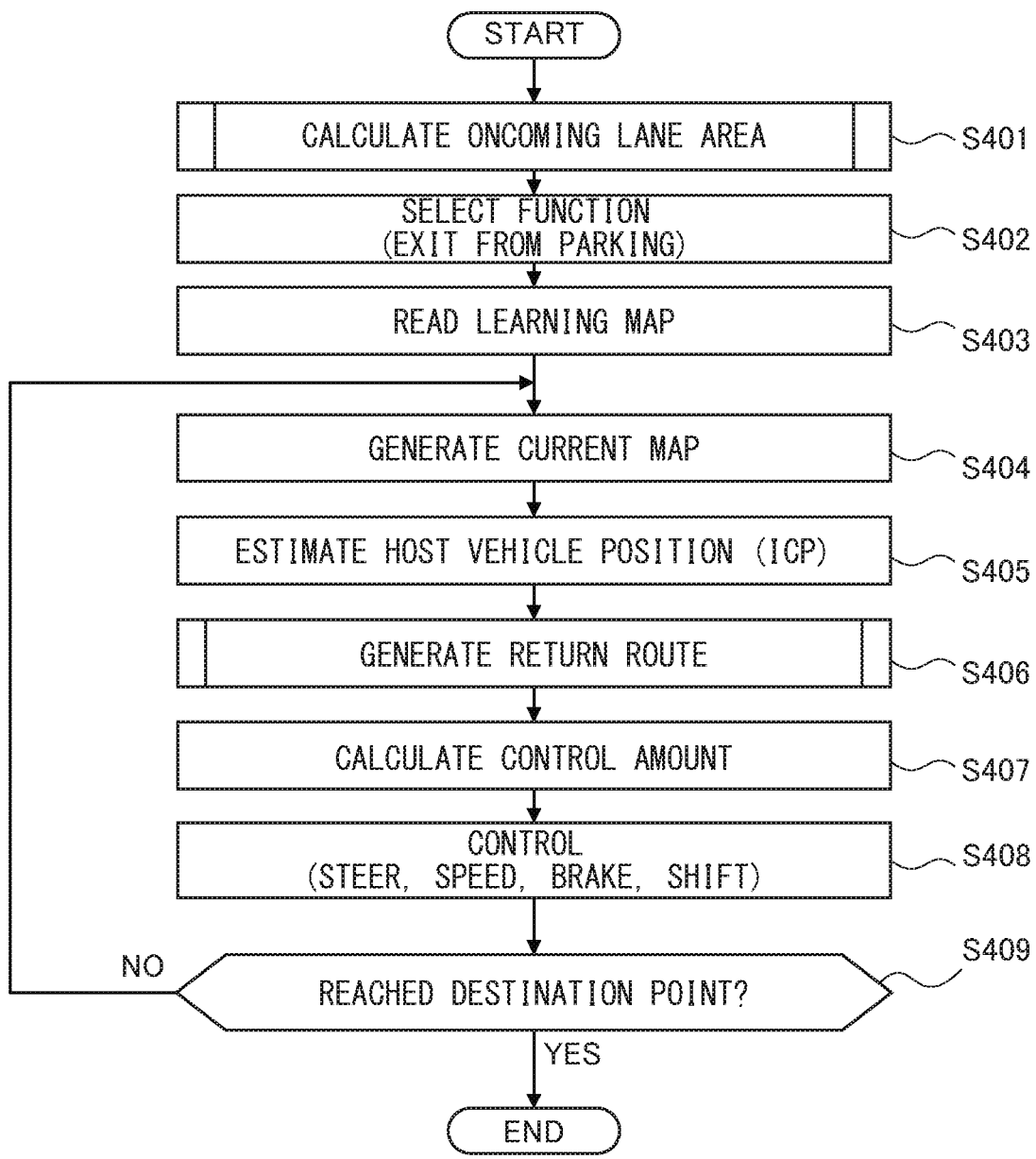
FIG. 12 is a flowchart showing a system flow of an in-vehicle processing device according to the second embodiment.
Figure 13:
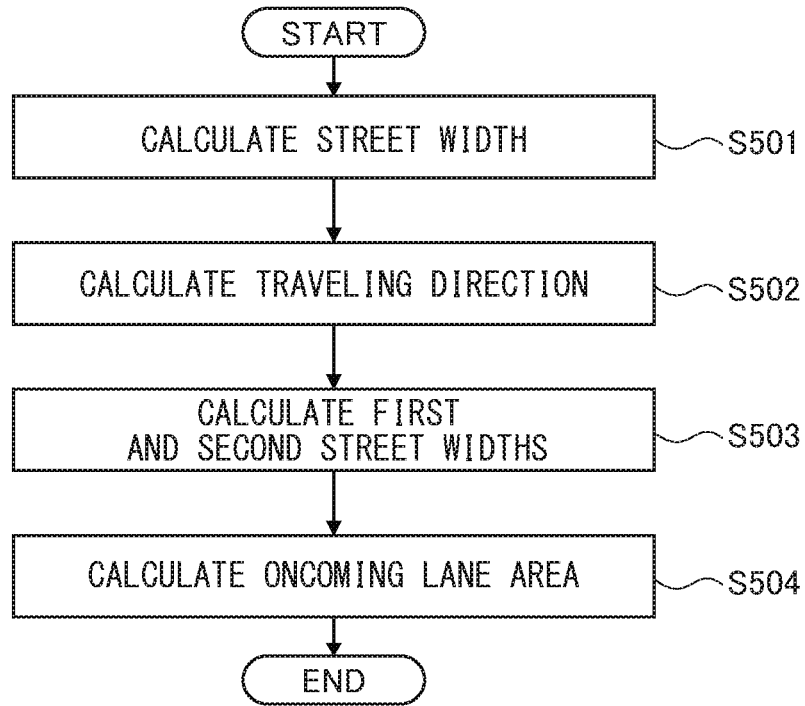
FIG. 13 is a flowchart showing a flow of an oncoming lane area calculation process according to the second embodiment.
Figure 14:
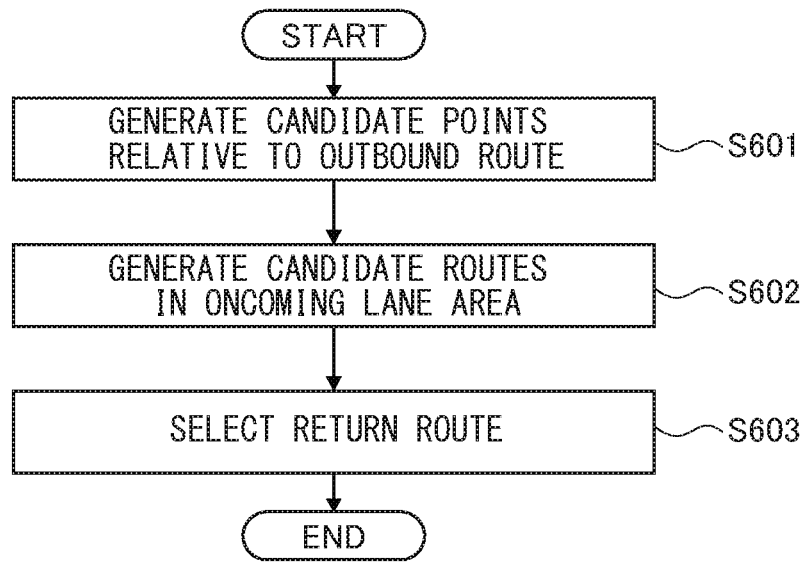
FIG. 14 is a flowchart showing a flow of a return route generation process according to the second embodiment.

FIG. 12 is a flowchart showing a system flow of the in-vehicle processing device of the second embodiment. FIG. 13 is a flowchart showing a flow of an oncoming lane area calculation process according to the second embodiment. FIG. 14 is a flowchart showing a flow of a return route generation process according to the second embodiment. Hereinafter, a flow of a process by the route calculation part 43 in the second embodiment will be described with reference to FIG. 12 to FIG. 14.

As shown in FIG. 12, the oncoming lane area calculation part 144 performs the oncoming lane area calculation process for calculating the direction of the oncoming lane opposite to the direction of the host vehicle E in which the host vehicle E travels when entering the parking space (Step S401). It should be noted that Steps S402 to S409 correspond to Steps S102 to S109 in the first embodiment.

As shown in FIG. 13, the street width calculation part 44b of the oncoming lane area calculation part 144 calculates the street width (width) dw of the street S identified by the street identification part 44a (Step S501).

Next, the traveling direction calculation part 44c calculates the traveling direction of the host vehicle E in the street S based on the vehicle parameter 32b (Step S502).

Then, the street width calculation part 44b calculates the first street width d1 and the second street width d2 based on the street width dw and the positional information calculated by the GNSS receiver 22 (Step S503). The first street width d1 is on the left side from the center of the host vehicle E and the second street width d2 is on the right side from the center of the host vehicle E in the traveling direction of the host vehicle E in the outbound route T1.

Next, the oncoming lane area calculation part 144 calculates the oncoming lane area Q relative to the host vehicle E from the traveling direction calculated by the traveling direction calculation part 44c (Step S504) Then, the oncoming lane area calculation process is terminated.

As shown in FIG. 14, the candidate point generation part 45 generates the plurality of candidate points n in a predetermined zone A1 in relation to the outbound route T1 based on the current peripheral information around the host vehicle and the current information on the host vehicle (Step S601).

Then, the candidate route generation part 46 generates the plurality of candidate routes C by connecting the candidate points n generated by the candidate point generation part 45 on the oncoming lane area Q opposite to the outbound route T1 in the street S on which the host vehicle E has previously traveled (Step S602).

Next, the route selection part 47 weights the five candidate routes C1 to C5 with the total distances thereof to select the return route C3 (Step S603). Then, the return route generation process is terminated.

The operation of the in-vehicle processing device 30 according to the second embodiment will be described. The in-vehicle processing device 30 according to the second embodiment includes the candidate point generation part 45 configured to generate a plurality of candidate points n in relation to the outbound route T1 of the street S on which the host vehicle E has traveled, the candidate route generation part 46 configured to generate a plurality of candidate routes C by connecting the candidate points generated by the candidate point generation part 45, and the route selection part 47 configured to select the return route C3 based on the plurality of candidate routes C generated by the candidate route generation part 46, wherein the candidate route generation part 46 is also configured to generate the plurality of candidate routes C on the oncoming lane opposite to the outbound route T1 (FIG. 9 and FIG. 10).

Thereby, the return route C3 on which the host vehicle E travels can be generated based on the outbound route T1 on which the host vehicle E has previously traveled. In addition, the return route C3 can be generated in a position of the street S away from the outbound route T1. Accordingly, an amount of meandering of the host vehicle E to avoid other vehicles traveling on the outbound route T1 can be reduced when the host vehicle E travels on the return route C3. As a result, the host vehicle E can travel on the return route C3 with the reduced meandering.

It should be noted that other configurations and the effect of the present embodiment are omitted since they are similar to those of the first embodiment.

Third Embodiment

An in-vehicle processing device according to the third embodiment differs from the in-vehicle processing device according to the second embodiment in that the configuration of a route selection part differs from that of the route selection part according to the second embodiment.

Figure 15:
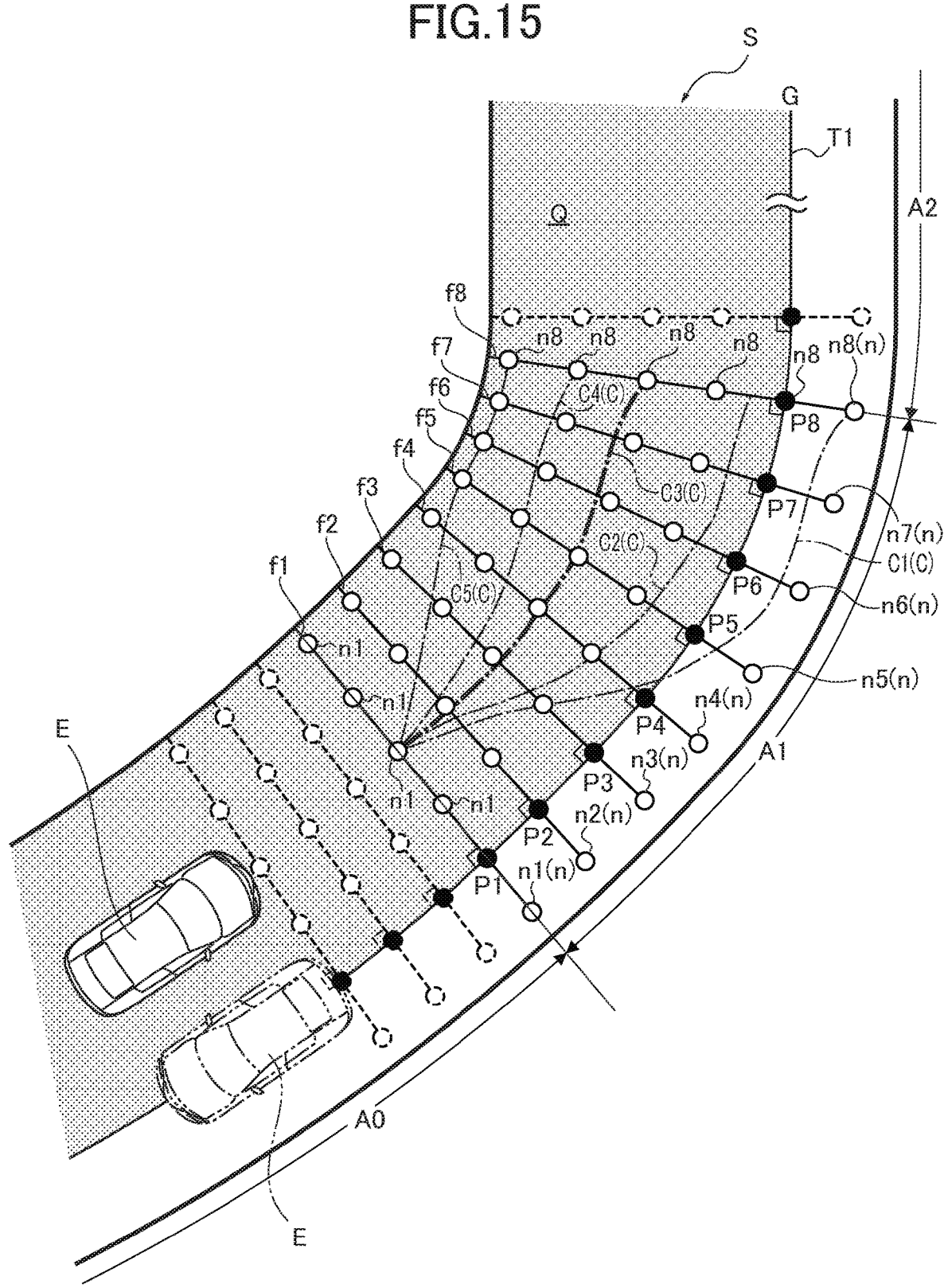
FIG. 15 is a schematic view illustrating a route selection part according to a third embodiment.

FIG. 15 is a schematic view illustrating a route selection part according to the third embodiment. Hereinafter, the configuration of the route selection part in the third embodiment will be described with reference to FIG. 15. It should be noted that the same terminologies and the same reference numerals are used for the elements identical or equivalent to the above embodiments.

As shown in FIG. 15, the route selection part 47 weights the candidate routes C2 to C5 which are on the oncoming lane opposite to the outbound route T1 among the five candidate routes C1 to C5. Further, the route selection part 47 weights the candidate routes C2 to C5 with the total distances thereof to select the return route C3.

Figure 16:
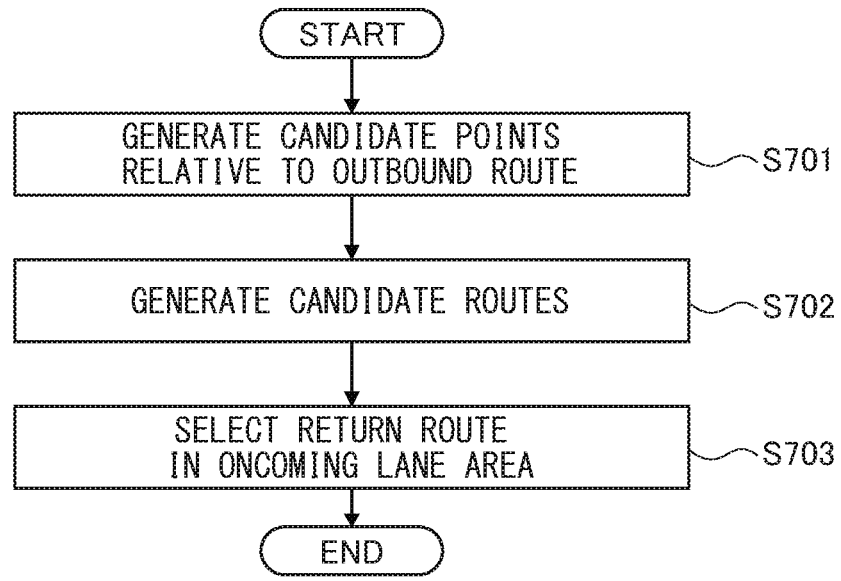
FIG. 16 is a flowchart showing a flow of a return route generation process according to the third embodiment.

FIG. 16 is a flowchart showing a flow of a return route generation process according to the third embodiment. Hereinafter, the flow of the return route generation process according to the third embodiment will be described with reference to FIG. 16.

As shown in FIG. 16, the candidate point generation part 45 generates a plurality of candidate points n in a predetermined zone A1 in relation to the outbound route T1 based on the current peripheral information around the host vehicle and the current information on the host vehicle (Step S701).

Then, the candidate route generation part 46 generates a plurality of candidate routes C by connecting the candidate points n generated by the candidate point generation part 45 in relation to the outbound route T1 of the street S on which the host vehicle E has previously traveled (Step S702).

Next, the route selection part 47 weights the five candidate routes C1 to C5 with the candidate routes in the oncoming lane area Q to select the candidate routes C2 to C5. Further, the route selection part 47 weights the selected candidate routes C2 to C5 with the total distances thereof so that the return route C3 is selected (Step S703). Then, the return route generation process is terminated.

The operation of the in-vehicle processing device 30 according to the third embodiment will be described. The in-vehicle processing device 30 according to the third embodiment includes the candidate point generation part 45 configured to generate a plurality of candidate points n in relation to the outbound route T1 in the street S on which the host vehicle E has previously traveled, the candidate route generation part 46 configured to generate a plurality of candidate routes C by connecting the candidate points n generated by the candidate point generation part 45, and the route selection part 47 configured to select the return route C3 based on the plurality of candidate routes C generated by the candidate route generation part 46, wherein the route selection part 47 is also configured to select the candidate routes C1 to C4 on the oncoming lane opposite to the outbound route T1 (FIG. 13).

Thereby, the return route C3 on which the host vehicle E travels can be generated based on the outbound route T1 on which the host vehicle E has previously traveled. Further, the return route C3 can be generated in a position on the street S away from the outbound route T1. Accordingly, an amount of meandering of the host vehicle E can be reduced when the host vehicle E travels on the return route C3 to avoid other vehicles traveling on the outbound route T1. As a result, the host vehicle E can travel on the return route C3 with the reduced meandering.

It should be noted that other configurations and the effect of the present embodiment are omitted since they are similar to those of the above embodiments.

Fourth Embodiment

An in-vehicle processing device according to the fourth embodiment differs from the in-vehicle processing device according to the second embodiment in that the configuration of a candidate point generation part differs from that of the candidate point generation part according to the second embodiment.

Figure 17:
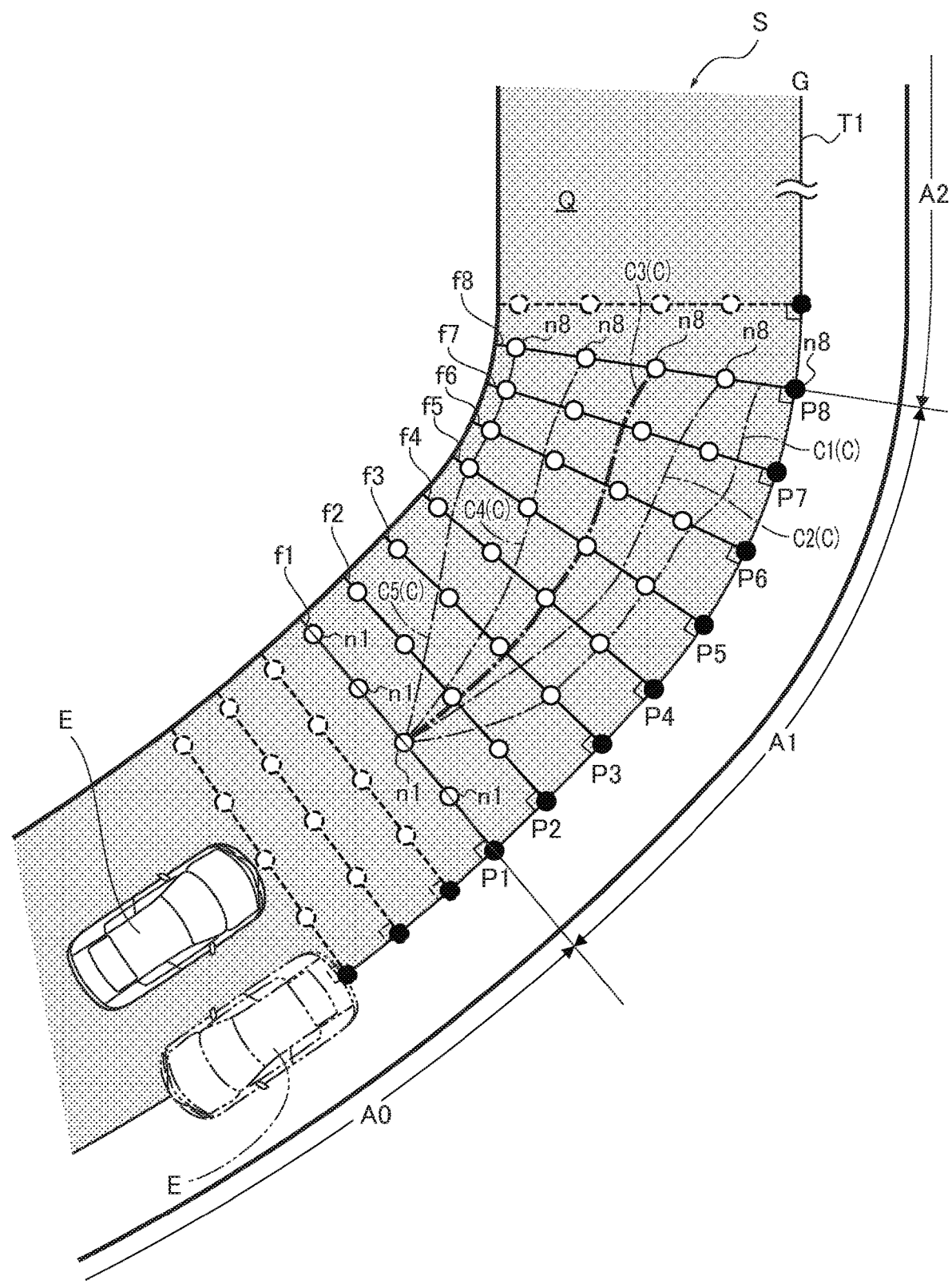
FIG. 17 is a schematic view illustrating a candidate point generation part according to a fourth embodiment.

FIG. 17 is a schematic view illustrating the candidate point generation part according to the fourth embodiment. Hereinafter, the configuration of the candidate point generation part in the fourth embodiment will be described with reference to FIG. 17. It should be noted that the same terminologies and the same reference numerals are used for the elements identical or equivalent to the above embodiments.

As shown in FIG. 17, the candidate point generation part 45 generates a plurality of candidate points n in the oncoming lane area Q. Specifically, the candidate point generation part 45 generates the plurality of candidate points n on the oncoming lane opposite to the outbound route T1 in the street S on which the host vehicle E has previously traveled.

Figure 18:
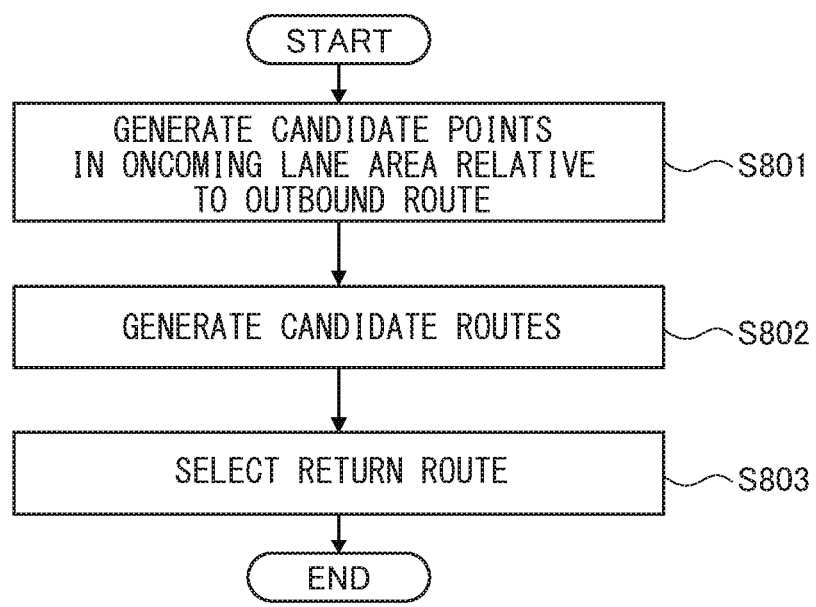
FIG. 18 is a flowchart showing a flow of a return route generation process according to the fourth embodiment.

FIG. 18 is a flowchart showing a flow of a return route generation process according to the fourth embodiment. Hereinafter, the flow of the return route generation process according to the fourth embodiment will be described with reference to FIG. 18.

As shown in FIG. 18, the candidate point generation part 45 generates a plurality of candidate points n in the oncoming lane area Q in the predetermined zone A1 opposite to the outbound route T1 based on the current peripheral information around the host vehicle and the current information on the host vehicle (Step S801).

Then, the candidate route generation part 46 generates a plurality of candidate routes C by connecting the candidate points n generated by the candidate point generation part 45 in relation to the outbound route T1 in the street S on which the host vehicle E has previously traveled (Step S802).

Next, the route selection part 47 weights the five candidate routes C1 to C5 with the total distances thereof to select the return route C3 (Step S803). Then, the return route generation process is terminated.

The operation of the in-vehicle processing device 30 according to the fourth embodiment will be described. The in-vehicle processing device 30 according to the fourth embodiment includes the candidate point generation part 45 configured to generate a plurality of candidate points n in relation to the outbound route T1 of the street S on which the host vehicle E has previously traveled, the candidate route generation part 46 configured to generate a plurality of candidate routes C by connecting the candidate points n generated by the candidate point generation part 45, and the route selection part 47 configured to select the return route C3 based on the plurality of candidate routes C generated by the candidate route generation part 46, wherein the candidate point generation part 45 is also configured to generate the plurality of candidate points n in the oncoming lane opposite to the outbound route T1 (FIG. 13).

Thereby, the return route C3 on which the host vehicle E travels can be generated based on the outbound route T1 on which the host vehicle E has previously traveled. In addition, the return route C3 can be generated in a position of the street S away from the outbound route T1. Consequently, an amount of meandering of the host vehicle E to avoid other vehicles traveling on the outbound route T1 can be reduced when the host vehicle E travels on the return route C3. As a result, the host vehicle E can travel on the return route C3 with the reduced meandering.

It should be noted that other configurations and the effect of the present embodiment are omitted since they are similar to those of the above embodiments.

The in-vehicle processing device according to the present disclosure has been described with reference to the embodiments. The specific configurations are not limited to the above embodiments, and changes in design, combinations of the embodiments, additions to the embodiments, and the like can be made without departing from the gist of the inventions recited in the claims.

In the first embodiment, the offset route generation part 44 generates the offset route T2 by offsetting the outbound route regardless of the offset amount Z. However, the offset route generation part may set a threshold and may not offset the route in a case where the offset amount Z is equal to or more than the width of the host vehicle E, and the offset route T2 cannot secure the clearance value 32c.

In the first to fourth embodiments, four or five candidate points n are generated in relation to each of the node points P1 to P8 in the zone A1. However, the number of the candidate points is not limited to four or five as in the above embodiments.

In the first to fourth embodiments, the narrowest area in the width direction of the host vehicle E among the areas V without obstacles such as parked vehicles, walls, curbstones, and the like is identified as the street S. However, the street may be an area without obstacles such as the parked vehicles, the walls, the curbstones, and the like as well as road markings such as lines of the parking spaces, lines of the pedestrian passage and the like.

In the first to fourth embodiments, the present disclosure is adopted to the exemplary case where the host vehicle travels autonomously on the return route when exiting from the parking space based on the outbound route on which the host vehicle has previously traveled when entering the parking space. However, the present disclosure may be adopted to open spaces other than the parking spaces as well as general roads, streets, and the like.

What is claimed is:

1. An in-vehicle processing device comprising:
one or more processors configured to control the in-vehicle processing device to:
generate an offset route on a street, that is a route offset from an outbound route on the street, on which a host vehicle has previously traveled, to a width direction of the host vehicle and an offset direction toward an oncoming lane, the offset route being in a direction opposite to the outbound route,
calculate a traveling direction of the host vehicle on the street based on a vehicle parameter,
calculate the offset direction from the traveling direction calculated,
generate a plurality of candidate points that are candidates for a return route based on the offset route generated and based on current peripheral information around the host vehicle and current information on the host vehicle, wherein the candidate points are not generated in places with obstacles,
generate a plurality of candidate routes by connecting the candidate points generated, and
select the return route based on the plurality of candidate routes generated.

2. The in-vehicle processing device according to claim 1, wherein the one or more processors are further configured to control the in-vehicle processing device to calculate the offset route based on the outbound route and a width of the street.

3. The in-vehicle processing device according to claim 2, wherein the current peripheral information is from a sonar, a radar, a rider, a stereo camera, and cameras and the current information is detected by a vehicle speed sensor and a steering angle sensor.

4. The in-vehicle processing device according to claim 1, wherein the current peripheral information is from a sonar, a radar, a rider, a stereo camera, and cameras and the current information is detected by a vehicle speed sensor and a steering angle sensor.

* * * * *